(12) United States Patent
Khaykovich et al.

(10) Patent No.: US 12,537,702 B2
(45) Date of Patent: Jan. 27, 2026

(54) SYSTEM AND METHOD FOR FACT VERIFICATION USING BLOCKCHAIN AND MACHINE LEARNING TECHNOLOGIES

(71) Applicant: JPMorgan Chase Bank, N.A., New York, NY (US)

(72) Inventors: Helene Khaykovich, Tel Aviv (IL); Shravan Kumar Parunandula, Hyderabad (IN); Pranav Deshpande, Nagpur (IN); Jacob Mendel, Givat Brenner (IL)

(73) Assignee: JPMORGAN CHASE BANK, N.A., New York, NY (US)

( * ) Notice: Subject to any disclaimer, the term of this patent is extended or adjusted under 35 U.S.C. 154(b) by 17 days.

(21) Appl. No.: 18/774,430

(22) Filed: Jul. 16, 2024

(65) Prior Publication Data

US 2024/0372739 A1 Nov. 7, 2024

Related U.S. Application Data

(63) Continuation of application No. 17/810,014, filed on Jun. 30, 2022, now Pat. No. 12,081,684.

(30) Foreign Application Priority Data

May 18, 2022 (IN) .............................. 202211028699

(51) Int. Cl.
*H04L 9/00* (2022.01)
*H04L 9/32* (2006.01)

(52) U.S. Cl.
CPC .............. *H04L 9/50* (2022.05); *H04L 9/3218* (2013.01)

(58) Field of Classification Search
CPC ................................ H04L 9/50; H04L 9/3218
See application file for complete search history.

(56) References Cited

U.S. PATENT DOCUMENTS 10,505,736 B1 * 12/2019 Meixler ................. H04L 9/3236
11,075,766 B1 * 7/2021 Norton .................. H04L 9/0819
11,100,197 B1 * 8/2021 Bernardi ................. H04L 51/18
(Continued)

OTHER PUBLICATIONS

OrbitDB, Peer-to-Peer Databases for the Decentralized Web, Release 6 dated Sep. 17, 2020.
(Continued)

*Primary Examiner* — Gary S Gracia
(74) *Attorney, Agent, or Firm* — Greenblum & Bernstein, P.L.C.

(57) ABSTRACT

A method for performing fact verification includes receiving a document for verification; identifying and extracting, on the computer network, at least two named entities from the document for verification and associated information as metadata; identifying, off-chain, identifiers of relevant documents corresponding to each of the at least two named entities, the relevant documents being authenticated documents including one or more of the at least two named entities; identifying a predetermined number of relevant documents among the identified relevant documents based on a number of the at least two named entities present and a number of occurrences for each of the named entities; and determining whether the document to be verified is supported by the predetermined number of relevant documents.

20 Claims, 8 Drawing Sheets

(56) References Cited

U.S. PATENT DOCUMENTS

| | | | | |
|---|---|---|---|---|
| 11,409,901 | B2* | 8/2022 | T | H04L 63/061 |
| 11,526,467 | B2* | 12/2022 | Shrinivasan | G06F 16/137 |
| 11,538,028 | B1* | 12/2022 | Dulub | G06Q 20/1235 |
| 11,558,344 | B1* | 1/2023 | Pezeshki | H04L 9/3247 |
| 11,664,987 | B2* | 5/2023 | Gupta | H04L 9/3268 |
| | | | | 713/157 |
| 11,922,532 | B2* | 3/2024 | Alattar | G06V 40/16 |
| 2006/0190723 | A1* | 8/2006 | Benson | H04L 9/3297 |
| | | | | 713/165 |
| 2019/0044727 | A1* | 2/2019 | Scott | G06F 21/645 |
| 2019/0065764 | A1* | 2/2019 | Wood | G06F 21/6209 |
| 2019/0297101 | A1* | 9/2019 | Dhakshinamoorthy | |
| | | | | G06F 21/6218 |
| 2020/0074552 | A1* | 3/2020 | Shier | G06Q 20/10 |
| 2020/0184097 | A1* | 6/2020 | T | H04L 9/3236 |
| 2020/0349125 | A1* | 11/2020 | Earley | H04L 9/0637 |
| 2020/0374104 | A1* | 11/2020 | Heath | G06F 16/1834 |
| 2020/0374125 | A1* | 11/2020 | Guillama | H04L 9/3234 |
| 2020/0403775 | A1* | 12/2020 | Huang | H04L 9/3297 |
| 2021/0019432 | A1* | 1/2021 | Sato | H04N 1/444 |
| 2021/0227093 | A1* | 7/2021 | Arakawa | H04L 9/3239 |
| 2021/0232539 | A1* | 7/2021 | Shrinivasan | H04L 9/50 |
| 2021/0232540 | A1* | 7/2021 | Shrinivasan | H04L 9/3239 |
| 2021/0233204 | A1* | 7/2021 | Alattar | G10L 19/018 |
| 2021/0243329 | A1* | 8/2021 | Sohma | H04N 1/4426 |
| 2021/0248272 | A1* | 8/2021 | Shrinivasan | G06F 21/645 |
| 2021/0286936 | A1* | 9/2021 | Choudhari | G06F 40/154 |
| 2021/0288936 | A1 | 9/2021 | Choudhari | G06F 40/154 |
| 2021/0400025 | A1* | 12/2021 | Agarwal | G06F 16/2379 |
| 2022/0021728 | A1* | 1/2022 | Kelly | G06F 21/6245 |
| 2022/0141353 | A1* | 5/2022 | Kamekawa | H04L 9/3226 |
| | | | | 358/1.14 |
| 2022/0188944 | A1* | 6/2022 | Wong | G06Q 30/0215 |
| 2022/0210061 | A1* | 6/2022 | Simu | H04L 9/3239 |
| 2022/0239495 | A1* | 7/2022 | Norton | H04L 9/0825 |
| 2022/0271958 | A1* | 8/2022 | Bassili | G06Q 20/367 |
| 2022/0327213 | A1* | 10/2022 | Raheman | G06F 21/57 |
| 2022/0370778 | A1* | 11/2022 | Azdoud | B25J 9/1697 |
| 2022/0383353 | A1* | 12/2022 | Wong | G06Q 30/0215 |
| 2022/0407725 | A1* | 12/2022 | Chai | H04L 9/50 |
| 2022/0407726 | A1 | 12/2022 | Chai | G06F 16/13 |
| 2023/0045071 | A1* | 2/2023 | Kalaldeh | G06Q 30/018 |
| 2023/0049791 | A1* | 2/2023 | Bunker, Jr | H04L 9/50 |
| 2023/0091451 | A1* | 3/2023 | Fujii | H04L 9/3247 |
| | | | | 705/66 |
| 2023/0129705 | A1* | 4/2023 | Wiklof | G06F 21/6245 |
| | | | | 726/26 |
| 2023/0131095 | A1* | 4/2023 | Korten | H04L 9/3226 |
| | | | | 713/171 |
| 2023/0141154 | A1* | 5/2023 | Cho | G06F 16/164 |
| | | | | 705/39 |
| 2023/0161699 | A1* | 5/2023 | Ng | G06F 21/64 |
| | | | | 711/202 |
| 2023/0177191 | A1* | 6/2023 | Chintala | G06F 21/602 |
| | | | | 726/1 |
| 2023/0185767 | A1* | 6/2023 | Hung | G06F 16/152 |
| | | | | 713/189 |
| 2023/0186262 | A1* | 6/2023 | Busch | G06F 21/1065 |
| | | | | 705/51 |
| 2023/0214365 | A1* | 7/2023 | Ahn | G06F 16/183 |
| | | | | 707/827 |
| 2023/0216947 | A1* | 7/2023 | Bernardi | H04L 67/10 |
| | | | | 713/150 |
| 2023/0229742 | A1* | 7/2023 | Antonioli | G06F 21/16 |
| | | | | 726/26 |
| 2023/0239166 | A1* | 7/2023 | Cheng | G06F 21/6218 |
| | | | | 713/165 |
| 2023/0267156 | A1* | 8/2023 | Goel | G06F 16/9532 |
| | | | | 707/709 |
| 2023/0274270 | A1* | 8/2023 | Bell | G06Q 20/3827 |
| 2023/0281604 | A1* | 9/2023 | Robell | G06Q 30/018 |
| 2023/0283861 | A1* | 9/2023 | Taylor | H04N 21/854 |
| | | | | 725/61 |
| 2023/0299964 | A1* | 9/2023 | Smith | H04L 9/3247 |
| | | | | 713/176 |
| 2023/0318835 | A1* | 10/2023 | DeKoven | H04L 63/10 |
| | | | | 713/159 |
| 2023/0370275 | A1* | 11/2023 | Aspler-Yaskil | H04L 9/50 |
| 2023/0379180 | A1* | 11/2023 | Khaykovich | H04L 9/50 |
| 2023/0394483 | A1* | 12/2023 | Liu | G06Q 20/3825 |
| 2023/0403171 | A1* | 12/2023 | Wiklof | H04L 63/123 |
| 2024/0070273 | A1* | 2/2024 | Almogbil | G06N 20/20 |

OTHER PUBLICATIONS

Zhou, Jie et al., "GEAR: Graph-based Evidence Aggregating and Reasoning for Fact Verification", Proceedings of the 57$^{th}$ Annual Meeting of the Association for Computational Linguistics, pp. 892-901, Florence, Italy, Jul. 28-Aug. 2, 2019.

Thoren, James et al., "FEVER: a large-scale dataset for Fact Extraction and VERification", Department of Computer Science, University of Sheffield, Amazon Research Cambridge, Proceedings of NAACL-HLT 2018, pp. 809-819, New Orleans, Louisiana, Jun. 1-6, 2018.

Augenstein, Isabelle et al., "MultiFC: A Real-World Multi-Domain Dataset for Evidence-Based Fact Checking of Claims" submitted Sep. 7, 2019, and updated Oct. 21, 2019, in Proceedings of EMNLP 2019.

Chen, Wenhu et al., "TABFACT: A Large-Scale Dataset for Table-Based Fact Verification", submitted Sep. 25, 2019, and modified Jun. 14, 2020, ICLR 2020 Conference Blind Submission.

Liu, Zhenghao et al., "Fine-grained Fact Verification with Kernel Graph Attention Network", Proceedings of the 58$^{th}$ Annual Meeting of the Association for Computational Linguistics, pp. 7342-7351.

Provable—Oracle service for smart contracts, dated Aug. 28, 2019.

Chainlink—Securely connect smart contracts with off-chain data and services, accessed Feb. 2022.

Hollander, Luit, "Understanding event logs on the Ethereum blockchain" dated Mar. 4, 2020.

Bit2me Academy, "What is a Bloom Filter?", accessed Feb. 2022.

Wikipedia, "List of fact-checking websites" first submitted Mar. 12, 2019, and last edited Sep. 3, 2022 (https://en.wikipedia.org/wiki/List_of_fact-checking_websites).

Wikipedia, "Vandalism on Wikipedia" first submitted Nov. 25, 2010, and last edited Sep. 9, 2022 (http://en.wikipedia.org/wiki/Vandalism_on_Wikipedia).

Hao, Karen, "OpenAI has released the largest version yet of its fake-news-spewing AI" dated Aug. 29, 2019, MIT Technology Review.

Brown, Shelby, "AI now can spot fake news generated by AI" dated Aug. 2, 2019 (https://www.cnet.com/news/ai-now-can-spot-fake-news-generated-by-ai/).

Simons, Tad, "Using AI to identify fake news" dated Oct. 28, 2020, Thomson Reuters Institute (https://www.thomsonreuters.com/en-us/posts/news-and-media/using-ai-identify-fake-news/).

"Fakebox", Machine Box, Veritone company accessed Feb. 2022 (https://machinebox.io/docs/fakebox?utm_source=medium&utm_medium=post&utm_campaign=fakenewspost).

Panetta, Kasey, "Gartner Top Strategic Predictions for 2020 and Beyond" dated Oct. 22, 2019 (https://www.gartner.com/smarterwithgartner/gartner-top-strategic-predictions-for-2020-and-beyond/).

Mearian, Lucas, "How blockchain could help block fake news" dated Feb. 17, 2020, Computerworld (https://www.computerworld.com/article/3526427/how-blockchain-could-help-block-fake-news.html).

Ivancsis, Bernet et al., "A technology of trust in a trustless information economy: Insights into The News Provenance Project" dated Jan. 23, 2020 (https://brown.columbia.edu/news-provenance-project/).

Fraga-Lamas, Paula et al., "*Fake News, Disinformation, and Deepfakes: Leveraging Distributed Ledger Technologies and Blockchain to Combat Digital Deception and Counterfeit Reality*" dated Oct. 20, 2019.

(56) References Cited

OTHER PUBLICATIONS

Dr. Mark van Rijmenam, "What's the current state of blockchain and fake news"?, dated Sep. 10, 2020 (https://vanrijmenam.nl/blockchain-can-prevent-spread-fake-news/).

Qayyum, Adnan et al., "Using Blockchain to Rein in The New Post-Truth World and Check The Spread of Fake News" dated Mar. 28, 2019, IEEE.

M. Steinebach et al., "Robust Hash Algorithms for Text" dated 2013.

Khelifi, Fouad and Bouridane, Ahmed (2019), "Perceptual Video Hashing for Content Identification and Authentication", IEEE Transactions on Circuits and Systems for Video Technology, 29 (1), pp. 50-67. ISSN 1051-8215.

Wikipedia, "Information extraction", first submitted Nov. 30, 2003, last updated Aug. 5, 2022 (https://en.wikipedia.org/wiki/Information_extraction).

The Fifth FEVER Workshop, dated May 26, 2022, Co-located with ACL 2022.

Thorne, James et al., "The Fact Extraction and VERification (FEVER) Shared Task", dated 2018.

\* cited by examiner

| | |
|---|---|
| Claim | A letter titled "ABC" published on January 1, 2010 on the Company X's website was uploaded by the Company X's CEO, Mr. John W. Smith III |
| Evidence # 1 | CEO of company X from January 1, 2008 to December 31, 2015 was John W. Smith III |
| Evidence # 2 | Letter titled "ABC" was published on the company X's website on January 1, 2010 |
| Evidence # 3 | Letter titled "ABC" was uploaded by John W. Smith III |
| Verdict | Supported |

SYSTEM AND METHOD FOR FACT VERIFICATION USING BLOCKCHAIN AND MACHINE LEARNING TECHNOLOGIES

CROSS-REFERENCE TO RELATED APPLICATION(S)

This application is a Continuation of U.S. patent application Ser. No. 17/810,014, filed Jun. 30, 2022, which claims priority benefit to Indian application No. 202211028699, filed May 18, 2022, which is hereby incorporated by reference in its entirety.

TECHNICAL FIELD

This disclosure generally relates to a system and method for providing distributed facts verification utilizing blockchain and machine learning technologies.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

The global rise of fake news, or false or misleading information presented as news, has become a legitimate threat to traditional democratic norms. For example, misinformation, fake press releases and fake financial news are sometimes published on companies' websites without the companies' permission, dangerously influencing their stock prices and public understanding of facts. Given the rapid rise in the spread of misinformation, journalistic fact-checking and reporting are not as reliable anymore and people have begun to seek automatic solutions. In order to counter the spread of misinformation, blockchain technology has been leveraged to trace origins of documents based on their hash. However, tracing media origins by storing their hash code on blockchain, as presently implemented, is not a method useful for verifying truthfulness of the fragment of text or to detect manipulated video or picture. Accordingly, blockchain technology may identify a full document if its hash code was previously stored on blockchain, but it is unable to verify if one of its claims is factually accurate.

SUMMARY

According to an aspect of the present disclosure, a method for performing fact verification is provided. The method includes performing, using a processor and a memory: receiving a document for verification on a cloud network; storing the document for verification on a private Inter Planetary File System (IPFS) network; performing, on the cloud network, a hashing operation on the document and generating a document hash, the document hash including a document identifier (ID); transmitting, from the cloud network to a blockchain, the document ID, the blockchain being facilitated by a plurality of computers; receiving the document ID from the blockchain and retrieving the document for verification corresponding to the document ID from the IPFS network; identifying and extracting, on the cloud network, at least two named entities from the document for verification and associated information as metadata; sending, to the blockchain, the document ID along with a metadata ID corresponding to the extracted metadata; identifying, on the blockchain, identifiers of relevant documents corresponding to each of the at least two named entities, the relevant documents being authenticated documents including one or more of the at least two named entities; identifying a predetermined number of relevant documents among the identified relevant documents based on a number of the at least two named entities present and a number of occurrences for each of the named entities; transmitting the document ID along with the identifiers of the predetermined number of relevant documents to the cloud network; performing verification of the document by executing one or more machine learning algorithms to determine whether the document to be verified is supported by the predetermined number of relevant documents; and providing and storing a verdict for the document to be verified with supporting evidence from the predetermined number of relevant documents.

According to another aspect of the present disclosure, the metadata specifies at least a type of the at least one named entity, a location of the at least one named entity with the document, and a number of occurrences.

According to another aspect of the present disclosure, the method further includes submitting an authenticated document to the cloud network; identifying and extracting one or more named entities from the authenticated document using a natural language processing algorithm; for each of the one or more named entities, identifying a type of a named entity, a number of occurrences of the named entity, and a location of the named entity within the authenticated document as metadata of the named entity; storing the authenticated document and the metadata in the private IPFS network; and storing an identifier of the authenticated document and an identifier of the metadata in the blockchain.

According to yet another aspect of the present disclosure, the one or more machine learning algorithms include a natural language processing (NLP) algorithm.

According to another aspect of the present disclosure, the performing of the verification is executed by at least one of analyzing text style, analyzing context, recognizing bias, and analyzing grammar.

According to a further aspect of the present disclosure, a claim included in the document is verified in the performing of the verification.

According to yet another aspect of the present disclosure, the supporting evidence includes a sentence in one of the relevant document including one or more of the at least two named entities.

According to a further aspect of the present disclosure, the supporting evidence further includes a preceding sentence and/or a subsequent sentence.

According to another aspect of the present disclosure, the supporting evidence includes material from a first document among the relevant documents including at least a first named entity among the at least two named entities, and material from a second document among the relevant documents including at least a second named entity among the at least two named entities.

According to a further aspect of the present disclosure, documents and metadata are stored in the IPFS but not in the blockchain, while identifiers corresponding to the documents and the metadata are stored in the blockchain.

According to a further aspect of the present disclosure, the private IPFS network is configured to allow nodes to come online at predetermined intervals.

According to a further aspect of the present disclosure, the blockchain is configured to perform off-chain processing.

According to a further aspect of the present disclosure, a smart contract resides in the blockchain.

According to a further aspect of the present disclosure, the document is a text document, a claim, an image, a video clip, a multimedia object or a digital object.

According to another aspect of the present disclosure, the verdict is a numerical score.

According to another aspect of the present disclosure, the verdict is a label indicating whether the document to be verified is supported, refuted or not enough information.

According to another aspect of the present disclosure, the blockchain is a proof-of-stake blockchain.

According to another aspect of the present disclosure, the blockchain is a proof-of-work blockchain.

According to another aspect of the present disclosure, a system for performing fact verification is disclosed. The system includes at least one processor; at least one memory; and at least one communication circuit. The at least one processor is configured to perform: receiving a document for verification on a cloud network; storing the document for verification on a private IPFS network; performing, on the cloud network, a hashing operation on the document and generating a document hash, the document hash including a document ID; transmitting, from the cloud network to a blockchain, the document ID, the blockchain being facilitated by a plurality of computers; receiving the document ID from the blockchain and retrieving the document for verification corresponding to the document ID from the IPFS network; identifying and extracting, on the cloud network, at least two named entities from the document for verification and associated information as metadata; sending, to the blockchain, the document ID along with a metadata ID corresponding to the extracted metadata; identifying, off of the block chain, identifiers of relevant documents corresponding to each of the at least two named entities, the relevant documents being authenticated documents including one or more of the at least two named entities; identifying a predetermined number of relevant documents among the identified relevant documents based on a number of the at least two named entities present and a number of occurrences for each of the named entities; transmitting the document ID along with the identifiers of the predetermined number of relevant documents to the cloud network; performing verification of the document by executing one or more machine learning algorithms to determine whether the document to be verified is supported by the predetermined number of relevant documents; and providing and storing a verdict for the document to be verified with supporting evidence from the predetermined number of relevant documents.

According to another aspect of the present disclosure, a non-transitory computer readable storage medium that stores a computer program for performing fact verification is disclosed. The computer program, when executed by a processor, causing a system to perform a process including receiving a document for verification on a cloud network; storing the document for verification on a private IPFS network; performing, on the cloud network, a hashing operation on the document and generating a document hash, the document hash including a document ID; transmitting, from the cloud network to a blockchain, the document ID, the blockchain being facilitated by a plurality of computers; receiving the document ID from the blockchain and retrieving the document for verification corresponding to the document ID from the IPFS network; identifying and extracting, on the cloud network, at least two named entities from the document for verification and associated information as metadata; sending, to the blockchain, the document ID along with a metadata ID corresponding to the extracted metadata; identifying, on the blockchain, identifiers of relevant documents corresponding to each of the at least two named entities, the relevant documents being authenticated documents including one or more of the at least two named entities; identifying a predetermined number of relevant documents among the identified relevant documents based on a number of the at least two named entities present and a number of occurrences for each of the named entities; transmitting the document ID along with the identifiers of the predetermined number of relevant documents to the cloud network; performing verification of the document by executing one or more machine learning algorithms to determine whether the document to be verified is supported by the predetermined number of relevant documents; and providing and storing, on the blockchain, a verdict for the document to be verified with supporting evidence from the predetermined number of relevant documents.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates a fact verification verdict with support evidence provided by NLP algorithms and blockchain based fact verification system in accordance with an exemplary embodiment.

DETAILED DESCRIPTION

Figure 1:
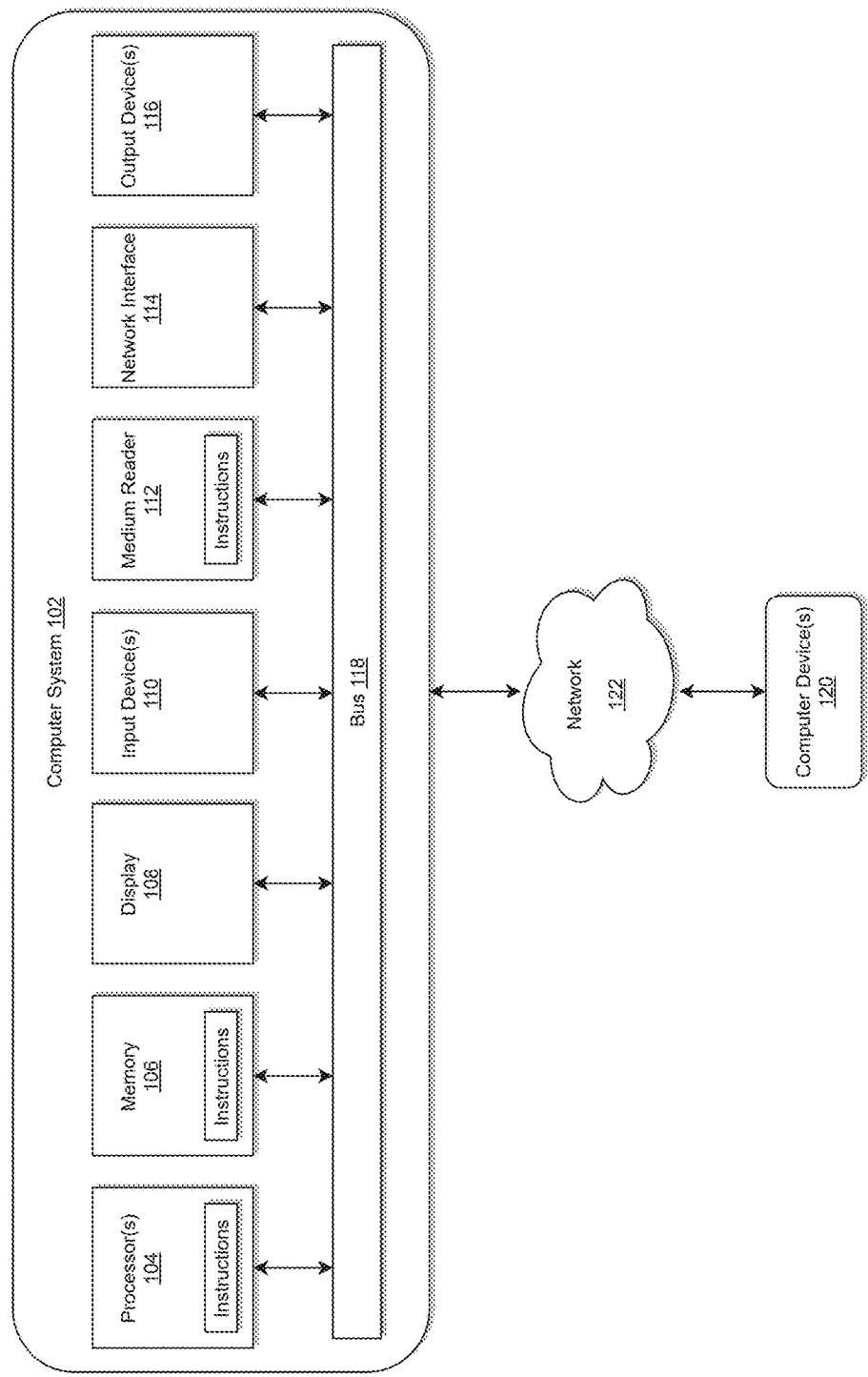
FIG. 1 illustrates a computer system for implementing a fact verification system in accordance with an exemplary embodiment.

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a fact verification system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The at least one processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include static memory, dynamic memory, or both in communication. Memory described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Computer memory 106 may include an article of manufacture and/or machine component. Memory described herein are computer-readable mediums from which data and executable instructions can be read by a computer. Memory as described herein may be random access memory (RAM), read-only memory (ROM), flash memory, erasable programmable read-only memory (EPROM), electrically erasable programmable read-only memory (EEPROM), registers, a hard disk, a cache, a removable disk, tape, compact disk read-only memory (CD-ROM), digital versatile disc (DVD), floppy disk, Blu-ray disc, or any other form of storage medium known in the art. Memory may be volatile or non-volatile, secure and/or encrypted, unsecure and/or unencrypted. Computer memory 106 may comprise any combination of memory or a single memory storage device.

The Computer System 102 may further include a Display 108, such as a liquid crystal display (LCD), an organic light-emitting diode (OLED), a flat panel display, a solid-state display, a cathode ray tube (CRT), a plasma display, or any other known display.

The Computer System 102 may also include at least one Input Device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art will appreciate that various embodiments of the Computer System 102 may include multiple input devices. Moreover, those skilled in the art further appreciate that the above-listed, exemplary Input Device(s) 110 are not meant to be exhaustive and that Computer System 102 may include any additional, or alternative, Input Device(s) 110.

The Computer System 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect (PCI), peripheral component interconnect express (PCIe), parallel advanced technology attachment (PATA), serial advanced technology attachment (SATA), and the like.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art would appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Those skilled in the art would appreciate that the above-listed devices are merely exemplary devices and that the computer device 120 may be any additional device or apparatus commonly known and understood by those skilled in the art without departing from the scope of the present application. For example, the computer device 120 may be the same or similar to the computer system 102. Furthermore, those skilled in the art will similarly understand that the device may be any combination of devices and apparatuses.

A person skilled in the art would appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
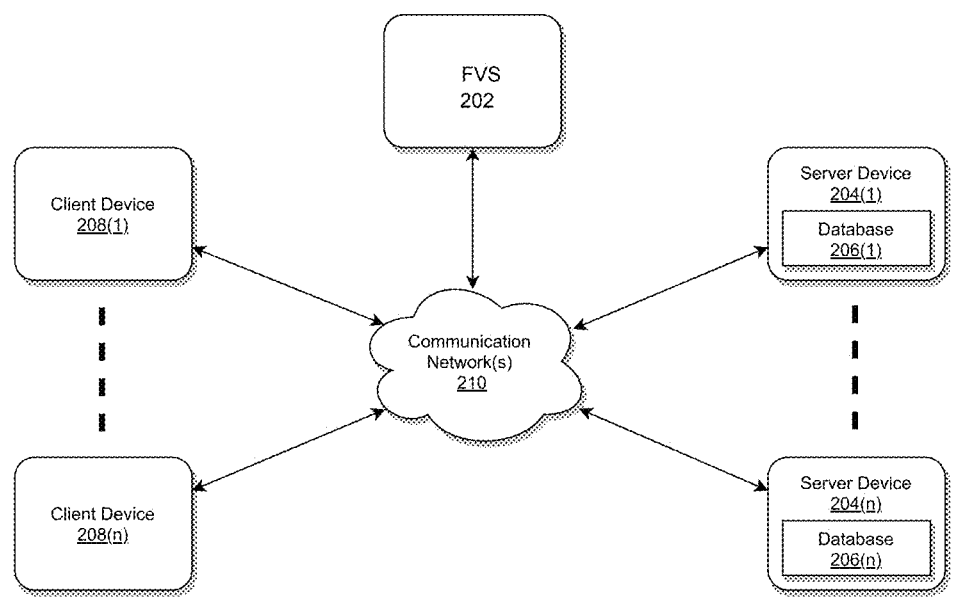
FIG. 2 illustrates an exemplary diagram of a network environment with a fact verification system in accordance with an exemplary embodiment.

FIG. 2 illustrates an exemplary diagram of a network environment with a fact verification system in accordance with an exemplary embodiment.

A fact verification system (FVS) 202 may be implemented with one or more computer systems similar to the computer system 102 as described with respect to FIG. 1.

The FVS 202 may store one or more applications that can include executable instructions that, when executed by the FVS 202, cause the FVS 202 to perform actions, such as to execute, transmit, receive, or otherwise process network messages, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the FVS 202 itself, may be located in virtual server(s) running in a cloud-based computing environment rather than being tied to one or more specific physical network computing devices. Also, the application(s) may be running in one or more virtual machines (VMs) executing on the FVS 202. Additionally, in one or more embodiments of this technology, virtual machine(s) running on the FVS 202 may be managed or supervised by a hypervisor.

In the network environment 200 of FIG. 2, the FVS 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the FVS 202, such as the network interface 114 of the computer system 102 of FIG. 1, operatively couples and communicates between the FVS 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FVS 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FVS 202 may be a standalone device or integrated with one or more other devices or apparatuses, such as one or more of the server devices 204(1)-204(n), for example. In one particular example, the FVS 202 may be hosted by one of the server devices 204(1)-204(n), and other arrangements are also possible. Moreover, one or more of the devices of the FVS 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FVS 202 via the communication network(s) 210 according to the HTTP-based protocol, for example, although other protocols may also be used. According to a further aspect of the present disclosure, in which the user interface (UI) may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the FVS 202 that may efficiently provide a platform for implementing a cloud native FVS module, but the disclosure is not limited thereto.

The client devices 208(1)-208(n) may run interface applications, such as standard web browsers or standalone client applications, which may provide an interface to communicate with the FVS 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FVS 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as would be appreciated by those skilled in the relevant art(s).

One or more of the devices depicted in the network environment 200, such as the FVS 202, the server devices 204(1)-204(n), or the client devices 208(1)-208(n), for example, may be configured to operate as virtual instances on the same physical machine. For example, one or more of the FVS 202, the server devices 204(1)-204(n), or the client devices 208(1)-208(n) may operate on the same physical device rather than as separate devices communicating through communication network(s) 210. Additionally, there may be more or fewer FVSs 202, server devices 204(1)-204(n), or client devices 208(1)-208(n) than illustrated in FIG. 2. According to exemplary embodiments, the FVS 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
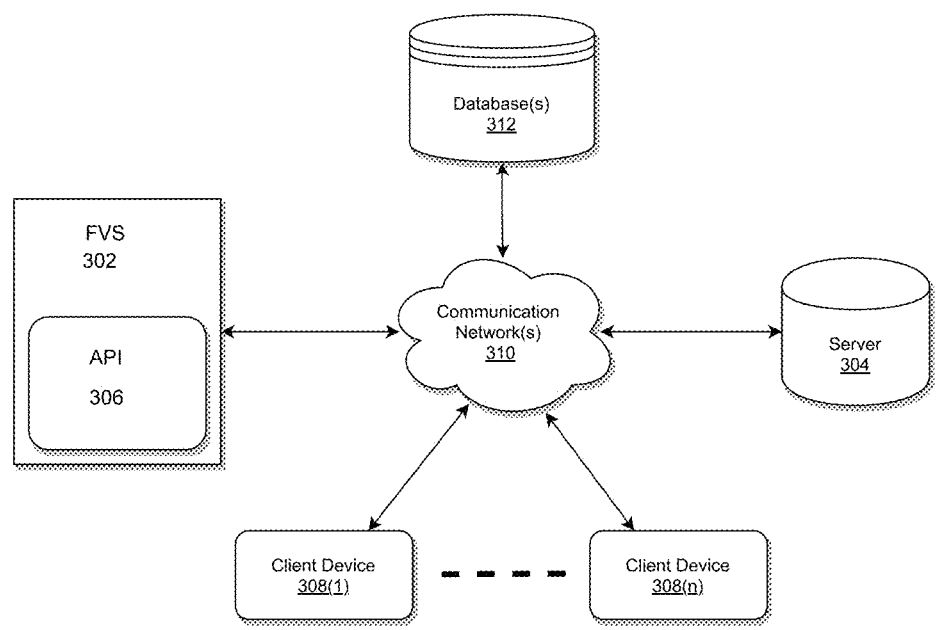
FIG. 3 illustrates a system diagram for implementing a fact verification system in accordance with an exemplary embodiment.

FIG. 3 illustrates a system diagram for implementing a fact verification system in accordance with an exemplary embodiment.

As illustrated in FIG. 3, the system 300 may include a site reliability engineering leaderboard system 302 within which a group of API modules 306 is embedded, a server 304, a database(s) 312, a plurality of client devices 308(1) . . . 308(n), and a communication network 310.

According to exemplary embodiments, the FVS 302 including the API modules 306 may be connected to the server 304, and the database(s) 312 via the communication network 310. Although there is only one database illustrated, the disclosure is not limited thereto. Any number of databases may be utilized. The FVS 302 may also be connected to the plurality of client devices 308(1) . . . 308(n) via the communication network 310, but the disclosure is not limited thereto.

According to exemplary embodiment, the FVS 302 is described and shown in FIG. 3 as including the API modules 306, although it may include other rules, policies, modules, databases, or applications, for example. According to exemplary embodiments, the database(s) 312 may be embedded within the FVS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a UI platform that is configured to enable FVS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with FVS 302. In this regard, the plurality of client devices 308(1) . . . 308(n) may be "clients" of FVS 302 and are described herein as such. Nevertheless, it is to be known and understood that the plurality of client devices 308(1) . . . 308(n) need not necessarily be "clients" of FVS 302, or any entity described in association therewith herein. Any additional or alternative relationship may exist between either or both of the plurality of client devices 308(1) . . . 308(n) and FVS 302, or no relationship may exist.

The first client device 308(1) may be, for example, a smart phone. The first client device 308(1) may be any additional device described herein. The second client device 308(n) may be, for example, a personal computer (PC) or any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the FVS 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The FVS 302 may be the same or similar to the FVS 202 as described with respect to FIG. 2, including any features or combination of features described with respect thereto.

Figure 4:
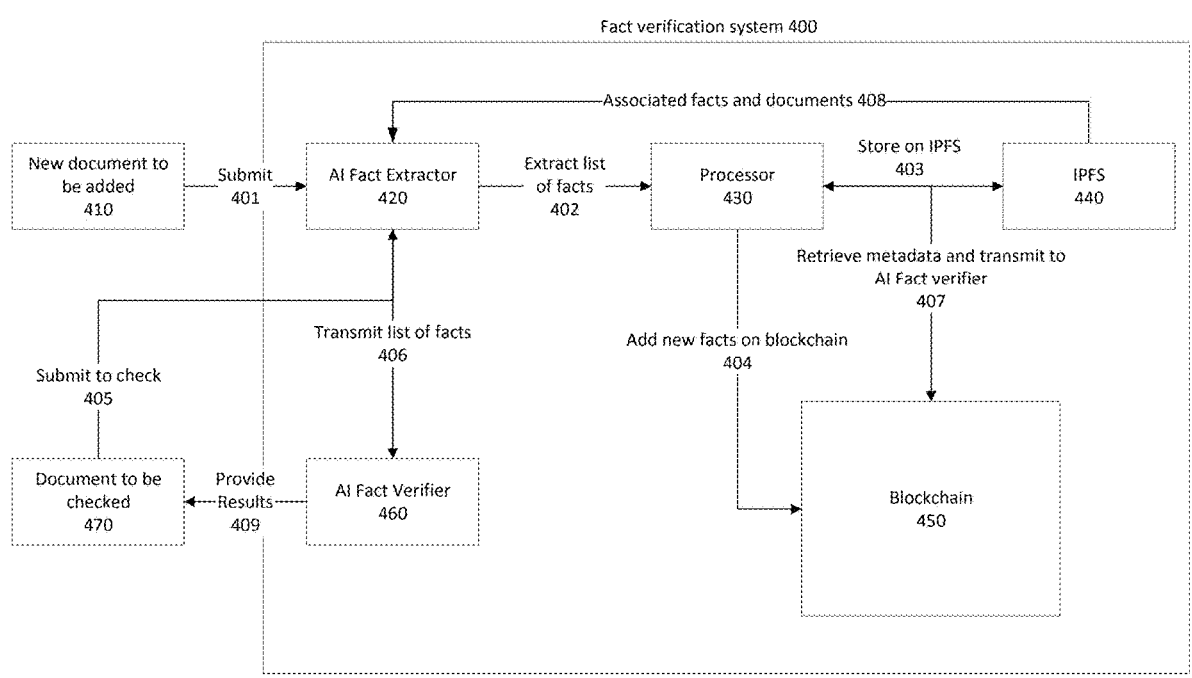
FIG. 4 illustrates a system architecture and a system flow for performing fact verification in accordance with an exemplary embodiment.

FIG. 4 illustrates a fact verification system architecture and flows in accordance with an exemplary embodiment.

Exemplary aspects of the present application are directed to checking for truthfulness of the document itself, rather than validity of a source of the document, based on a set of verified data stored on one or more block chains. In an example, a document may include, without limitation, a textual document, an image, a video or the like. Taking in account that hash code verification may be limited (e.g., one modified pixel of the image or letter in the text result in completely different hash code), the more efficient approach would be leveraging AI algorithms and tolerant to noises hash codes.

According to exemplary aspects, fact verification of a document may be performed by extracting a list of facts from previously authenticated documents, establishing fact identity for one or more of the facts in the list, and storing such facts with the established fact identity on a blockchain with reference to the original document stored on an IPFS or any distributed database, file system or ledger.

In an example, a distributed ledger may include databases that are spread across several nodes on a peer-to-peer network. Each node on the peer-to-peer network may replicate and save an identical copy of a ledger and update itself independently without input from a central administrator. In another exemplary embodiment, when a ledger update is requested, each node may construct a new transaction in the ledger. Each node may then utilize a consensus algorithm to determine which of the newly generated transactions most accurately represent the requested ledger update. Based on a result of the determination, all the nodes in the peer-to-peer network may update their own ledgers with the agreed upon new transaction. As would be appreciated by a person of ordinary skill in the art, the communication between each of the nodes may be secured via cryptographic keys and electronic signatures or any other suitable authentication mechanism.

Moreover, according to exemplary aspects, the distributed ledger may include at least one blockchain. The blockchain may include a plurality of blocks corresponding to a growing list of records. Each of the plurality of blocks on the blockchain may include digital pieces of information such as, for example, a date, a time, a location, participant/organization names that correspond to a transaction and the like. Each of the plurality of blocks on the blockchain may also include identifying data which distinguishes a particular block from other blocks on the blockchain. In another exemplary embodiment, each block may utilize a unique code such as, for example, a hash as identifying data. The hashes may include cryptographic codes that are automatically generated by an algorithm.

In another exemplary embodiment, after a transaction has occurred, the transaction may be verified, and the details of the transaction may be confirmed. Then, information corresponding to the transaction may be stored in a block. In another exemplary embodiment, transaction data from a plurality of transactions may be packaged together in a single block. Once a block has been compiled, a hash unique to the block may be automatically generated and encoded within the block. In another exemplary embodiment, a hash value of a preceding block may also be encoded within the block. Finally, the compiled block may then be added to the blockchain. In another exemplary embodiment the blockchain may include a public blockchain and a private blockchain.

According to exemplary aspects, to check a new document, a list of facts extracted from a target document may be compared with the ones stored on blockchain using one or more AI or ML algorithms or tools. Based on a score attributed from analysis of the target document indicating a level of truthfulness, a user may be provided with a list of related facts allowing the user to judge the truthfulness of the document.

According to exemplary aspects, a fact identity may be composed of a list of normalized metadata. For example, the fact's date, location, name of persons, companies or the like may be indicated. Based on the fact identity and corresponding list of normalized metadata may allow to generically process texts as well as images/video data.

In an example, for historical data verification, it may be possible to scan entire books, archives or memoirs and to create a verified and immutable chain of historical facts.

As illustrated in FIG. 4, verified or authentic documents may be submitted to the fact verification system 400 for adding new metadata associated with or corresponding to facts to one or more blockchains. In addition, documents, articles, claims, images, video clips, digital objects, multimedia objects may be submitted to the fact verification system 400 for verification of facts based on authenticated and immutable data stored in one or more blockchains using one or more AI or ML algorithms.

According to exemplary aspects, the fact verification system 400 includes an AI fact extractor 420, a processor 430, an IPFS 440, a blockchain 450 and an AI fact verifier 460. One or more of these components may be implemented by integrated circuits and one or more processors. Although only five components are illustrated herein, aspects of the present disclosure are not limited thereto, such that the fact verification system 400 may include more or less components.

In operation 401, an authenticated document is submitted to the AI fact extractor 420. The AI fact extractor 420 may use one or more AI or ML algorithms and models to extract out a lists of facts for building fact metadata. According to exemplary aspects, the list of facts extracted may include a description of the respective facts along with corresponding metadata (e.g., date, location, name of persons, companies and the like). Further, the AI fact extractor 420 may be capable of performing additional processing of text summarization and divide a document into semantically independent parts, and then extract and store metadata for each of the semantically independent parts.

Although the AI fact extractor is exemplarily illustrated for performing fact verification, aspects of the present disclosure are not limited thereto, such that an NLP named entities extractor may be additionally used to build metadata for each fact in conjunction with the AI fact extractor or after processing by the AI fact extractor. According to exemplary aspects, an NLP-named entities extractor may perform processing to extract out separate named entities to build metadata used to define text segments, and to be used for verification based on a location of the relevant named entities.

In an example, AI or ML algorithms may be executed to perform data pattern detection, and to provide an output or render a decision (e.g., identification of a fact to be extracted) based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. A machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, transformer based NLP models, a decision tree technique, a support vector machines technique, a Bayesian network technique, and a genetic algorithms technique.

In operation 402, the AI fact extractor 420 transmits the extracted list of facts to a processor 430 for analyzing/calculating the document, fact descriptions, and hashes. In operation 403, the processor 430 transmits the processed document and corresponding fact description to IPFS 440 for storage therein. In operation 404, the processor 430 also transmits the new fact and its metadata hashes together with document hash and IPFS hash to a blockchain 450. More specifically, metadata associated to facts with description hash, document hash and IPFS hash are sent to the blockchain 450. In an example, the blockchain 450 may be an Ethereum blockchain or other blockchains having smart contract capabilities. Further, the blockchain 450 may utilize proof-of-work blockchain technology or proof-of-stake blockchain technology.

The blockchain 450 then stores metadata associated facts with description hash, document hash, and IPFS hash in one or more blocks of the blockchain 450. Operations 401-404 may be repeated for a number of authenticated documents for building a verified/authenticated fact metadata. Although operations 401-404 are disclosed for building the verified/authenticated fact metadata for performing verification of suspect documents, aspects of the present disclosure are not limited thereto, such that less or more operations may be performed for building the verified/authenticated fact metadata.

Operations 405 to 409 may be performed for verifying a suspect document. However, aspects of the present disclosure are not limited thereto, such that more or less operations may be performed for verifying/authenticating the suspect document. Further, although disclosure provided herein is described with respect to a document, aspects of the disclosure are not limited to a written document including alphanumeric characters, such that the document may be an image, a video, a hologram, a digital or multimedia object or the like.

In operation 405, the suspect document to be verified is submitted to the AI fact extractor 420. Upon submission to the AI fact extractor 420, the AI fact extractor 420 extracts out a list of facts from the document to be verified and sends an extracted list of facts to the AI fact verifier in operation 406. In an example, the list of facts may include, without limitation, descriptions included in the document to be verified along with corresponding metadata built from extracted named entities.

In operation 407, the AI fact extractor 420 may request the processor 430 to obtain facts and documents that are most relevant to the facts metadata from the blockchain 450. More specifically, IPFS IDs of facts are obtained from the blockchain 450.

In operation 408, the AI fact extractor 420 obtains and extracts associated facts and documents from IPFS 440.

In operation 409, the AI fact verifier 460 executes one or more AI or ML algorithms or models to generate a score or a verdict along with supporting evidence and/or a list of related documents. According to exemplary aspects, the one or more AI or ML algorithms may be executed based on, without limitation, the list of facts extracted from the document to be checked 470, related metadata stored in the IPFS, and most relevant (based on metadata) facts and documents for generating the score or verdict. However, aspects of the present disclosure are not limited thereto, such that additional algorithms or models may be executed to check for authenticity based on semantics, text style, inclusion of bias, use of grammar, spelling errors and the like. For example, use of incorrect or foreign grammar and/or various spelling errors may raise question of authenticity and may be scored accordingly.

For example, as illustrated in FIG. 7, a verdict for the claim of "a letter titled "ABC" published on Jan. 1, 2010 on the Company X's website was uploaded by the Company X's CEO, Mr. John W. Smith III" may be outputted by the AI fact verifier 460 of the fact verification system 400. In this example, evidences #1, #2 and #3 retrieved from one or more blockchains may be provided for the verdict. According to exemplary aspects, each of the evidences #1, #2 and #3 is independently verified and stored in blockchains. More specifically, the immutable verified facts in evidence #1 provide that CEO of company X from Jan. 1, 2008 to Dec. 31, 2015 was John W. Smith III. Immutable verified facts in evidence #2 provide that the letter titled "ABC" was published on the company X's website on Jan. 1, 2010. Lastly, immutable verified facts in evidence #3 provide that the letter titled "ABC" was uploaded by John W. Smith III. Based on the evidences #1, #2 and #3, one or more AI or ML algorithms executed by the AI fact verifier 460 may conclude that the submitted claim for verification is adequately supported by the immutable facts included on the one or more blockchains. Once the claim is verified, corresponding metadata may be added to the blockchain 450. Further, one or more AI or ML algorithms may be updated in view of the verified or authenticated document or claim.

Figure 5:
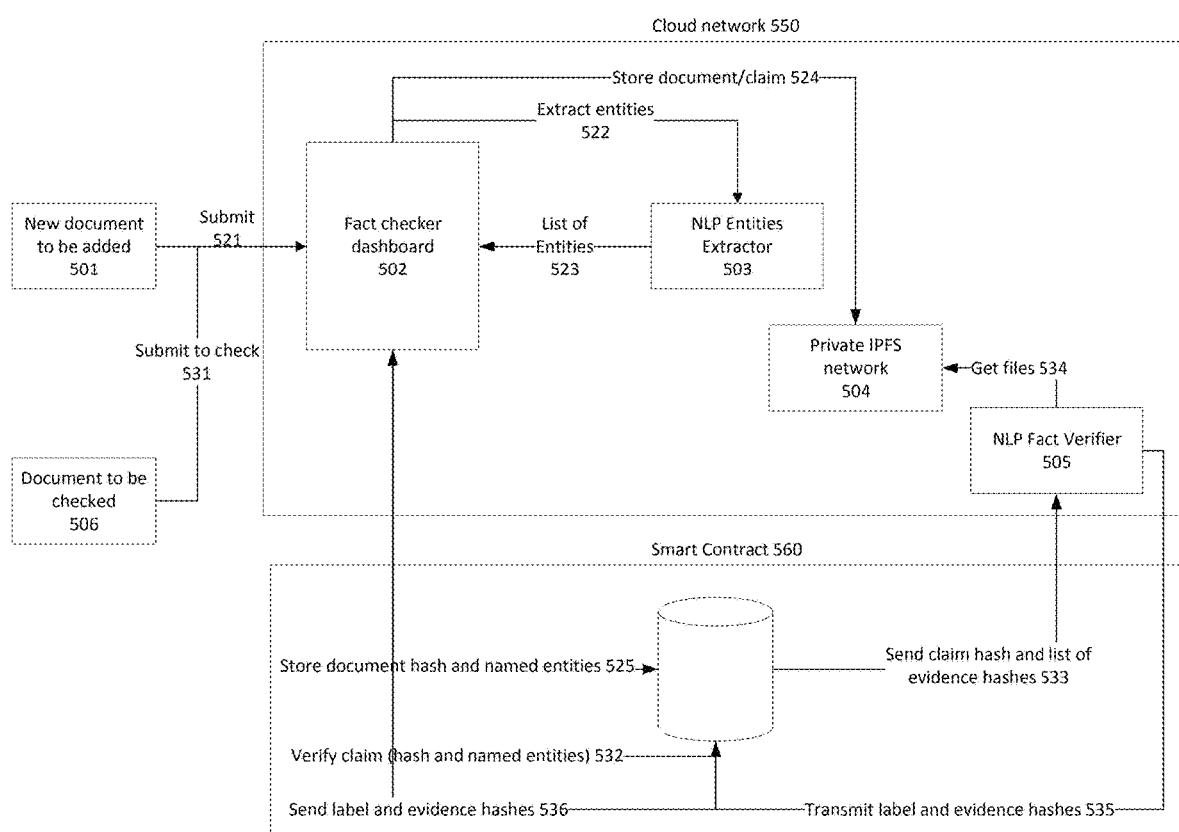
FIG. 5 illustrates a system architecture and a system flow of a NLP algorithm and blockchain smart contract-based fact verification system in accordance with an exemplary embodiment.

FIG. 5 illustrates a system architecture and a system flow of one or more NLP algorithms and blockchain smart contract-based fact verification system in accordance with an exemplary embodiment.

As exemplarily illustrated in FIG. 5, a fact verification system may be implemented using a system of cloud network 500 components with a smart contract 560 residing on a blockchain. The cloud network 500 may include a fact checker dashboard 502, an NLP entities extractor 503, a private IPFS network 504 and an NLP fact verifier 505. However, aspects of the present disclosure are not limited thereto, such that more or less components may be included herein.

In operation 521, the new authenticated document to be added 501 is submitted to a fact checker dashboard 502. In an example, the new authenticated document may be previously authenticated or received from a trusted source. The authenticated document may be a written article, an image, a moving image, a video clip, a multimedia object, a digital object and the like.

In operation 522, the fact checker dashboard 502 may transmit, to the NLP entities extractor 503, a request to extract various entities from the new document to be added 501. In an example, the NLP entities extractor 503 may be an off-chain extractor service The NLP entities extractor 503 then extracts the list of entities using one or more NLP algorithms, and transmits the extracted list of entities to the fact checker dashboard 502 in operation 523. For example, the NLP entities extractor 503 may process the new document to be added 501 to identify and extract out entities. For example, named entities, such as a name of a company, product, data, organization, person, location and the like may be identified and extracted. More specifically, a name of an entity, a type of the entity, number of times entity is mentioned, location within the document where the entity is found, and other information may be extracted. Based on the extracted information with respect to the identified entities found in the new document to be added, corresponding metadata may be generated. For example, the metadata may specify various types of entities identified in the document. For each type identified, name of the entity corresponding to the entity type may be listed along with number of occurrences and locations at which the entity was identified.

According to exemplary aspects, NLP algorithms may recognize biased text or verify a claim using a provided set of evidence.

In operation 524, the new document or claim included in the new document is stored in the private IPFS network 504. Further, metadata built from the extracted entities may also be stored in the private IPFS network 504. In an example, the actual document (or image, video clip, digital object, or the like) may be stored in the private IPFS network 504. Moreover, storage in the private IPFS network 504 may provide for immutable storage of the stored documents. According to exemplary aspects, a private IPFS network may include nodes that may always come online every few minutes/hours. Such an architecture may be GDPR (General Data Protection Regulation) compliant.

In operation 525, document hash or ID generated for the new document to be added 501 and metadata ID of the metadata built from the list of entities extracted from the new document to be added 501 are then sent to be stored in one or more blocks in a blockchain storing the smart contract 560.

In operation 531, a document to be checked 506 is submitted to the fact checker dashboard 502. The fact checker dashboard may submit the document to be checked 506 to the NLP entities extractor 503 in operation 522. In operation 523, the NLP entities extractor 503 identifies and extracts various entities included in the document to be checked 506 and sends a list of the extracted entities to the fact checker dashboard 502. In operation 524, the document to be checked 506 is sent to the private IPFS network 504 to be stored thereon. However, if the document to be checked 506 is later determined not to be supported by the evidence stored in one or more blockchains, the document to be checked 506 may be removed from storage.

In operation 532, the fact checker dashboard 502 may send a claim included in the document to be checked 506 to the blockchain storing the smart contract 560 for verification. In an example, the claim to be checked may include claim/document hash and named entities (and corresponding metadata).

In operation 533, the blockchain storing the smart contract 560 may identify a list of most relevant document hashes based on the provided named entities and metadata. For example, for verifying a claim of "€ is the currency sign for the euro in 2022", documents containing "€" and "euro" named entities with maximal number of entities occurrences may be identified. In order to perform such a search, an inverted indexes of all of the named entities with reference to the IPFS ID and number of occurrences may be specified. See e.g., table 1 provided below.

| Named Entity | Documents |
| --- | --- |
| euro | (Doc 1, 3), (Doc 15, 1), . . . |
| € | (Doc1, 3), (Doc 2, 2), . . . |

For example, for the named entity of €, it may note a document having an identifier of "1" may have "3" number of occurrences of the respective named entity. Based on identified documents, union of the documents list may be calculated. Each document may specify numbers of found entities and sum of occurrences. Based on the identified documents, top predetermined number of documents (e.g., top five) may be identified as support evidence. The inverted indexes may be stored in the distributed database built upon IPFS technology.

In operation 534, the NLP fact verifier 505 may be able to retrieve the documents included in the top predetermined number of documents based on their respective identifiers (ID) from the private IPFS network 504. Once a list of relevant documents is retrieved, the documents' metadata with the start and end of entities may be used to determine which part of the text to use for sentence selection. For example, a predetermined number of words or sentence before the start or after the end of the entities may be identified for selection of evidentiary text to be utilized.

Based on the retrieved documents, the NLP fact verifier 505 may be able to render a verdict as to whether the document or claim to be checked 506 is sufficiently supported by the verified evidence stored in the blockchain smart contract 560.

The NLP fact verifier 505 may then perform verification of the submitted claim/document based on the list of evidence hashes provided by the blockchain smart contract 560 as exemplified in FIG. 7 discussed above. Based on the relevant evidence, a score or a label may be provided to indicate a level of authenticity. For example, a numerical score, an alphabetical score, or a label (e.g., supported, refuted, not enough information) may be provided. However, aspects of the present disclosure are not limited thereto, such that additional algorithms or models may be executed to check for authenticity based on semantics, use of grammar, spelling errors and the like. For example, use of incorrect or foreign grammar and/or various spelling errors may raise question of authenticity and may be scored accordingly.

In operation 536, the determined score or label along with evidence hashes are sent back to the fact checker dashboard 502 to display a verdict for the document to be checked 506 along with evidence relied on for reaching the verdict.

Figure 6A:
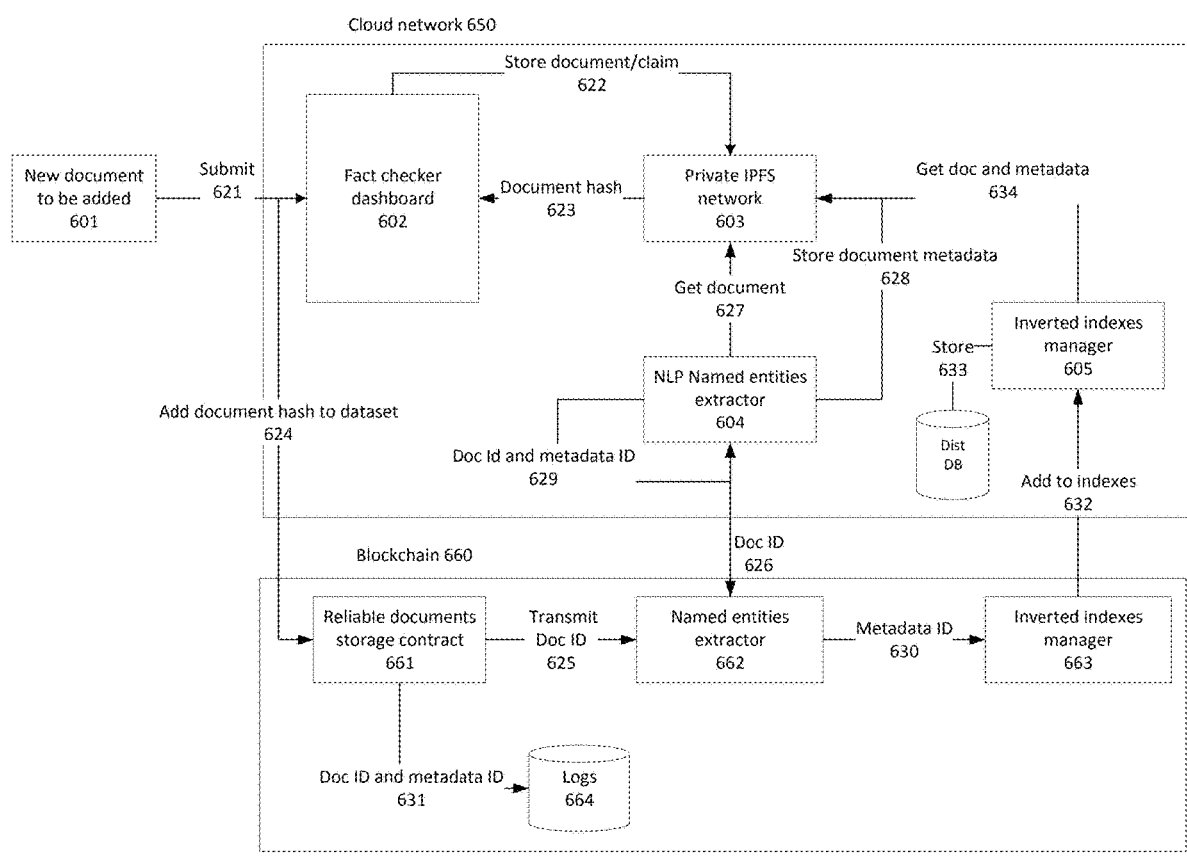
FIG. 6A illustrates a system architecture and a system flow for adding a document to a NLP algorithm and blockchain-based fact verification system in accordance with an exemplary embodiment.

FIG. 6A illustrates a system architecture and a system flow for adding a document to an NLP algorithms and blockchain based fact verification system in accordance with an exemplary embodiment.

FIG. 6A illustrates interactions between one or more computing devices residing in a cloud network 650 with one or more computing devices forming a blockchain 660. The cloud network 650 includes a fact checker dashboard 602, a private IPFS networks 603, an NLP named entities extractor 604, and an inverted indexes manager 605. On the other hand, the blockchain 660 includes a reliable documents storage contract 661, a named entities extractor 662, an inverted indexes manager 663 and logs 664.

In operation 621, a new document to be added 601 is submitted to the fact checker dashboard 602. In operation 622, the new document to be added 601 is stored in the private IPFS network 603. The private IPFS network 603 then processes the new document to be added 601 to generate a document hash for identifying the document stored in the private IPFS network 603, and transmits the document hash to the fact checker dashboard 602 in operation 623. In operation 624, the fact checker dashboard 602 then sends the document hash to the dataset for storage in the reliable documents storage contract 661 of the blockchain 660.

In operation 625, document identifier (ID) is identified from the document hash and sent to the named entities extractor 662 of the blockchain 660. In operation 626, the named entities extractor 662 transmits the document ID to the NLP named entities extractor 604. In an example, the named entities extractor 662 allows the fact verification system to separately perform on-chain and off-chain processing for performing more efficient or quicker processing while retaining data immutability of blockchain technology. Further, off-chain processing capabilities may allow for less amount of cryptocurrencies (e.g., Ethereum) to be expanded for performing transactions. More specifically, calculations and processing of documents may be performed off-chain, while storage of document IDs and metadata IDs may be retained on-chain.

According to exemplary aspects, the NLP named entities extractor 604 may perform processing to extract out separate named entities and define text segments to be used for verification based on a location of the relevant named entities. Although an NLP named entities extractor is exemplarily illustrated for performing fact verification, aspects of the present disclosure are not limited thereto, such that an AI factor extractor may be used in conjunction with or before the named entities extractor. In an example, an AI factor extractor may be capable of performing additional processing of text summarization and divide a document into semantically independent parts, and extract and store metadata for each of the semantically independent parts.

In operation 627, the NLP named entities extractor 604 obtains documents corresponding to the document ID from the private IPFS networks 603. Once retrieved, the retrieved document is processed to extract out various named entities. In an example, named entities may be identified and categorized according to type (e.g., person, location, organization, date, and etc.), number of occurrences of for each of the named entities may be identified as well as location within the document where the named entity may be found.

In operation 628, extracted named entities and corresponding metadata are sent to the private IPFS network 603 for storage. In operation 629, document ID along with metadata ID for the metadata extracted in operation 628 are sent to the named entities extractor 662 of the blockchain 660. In operation 630, the metadata ID is sent to the inverted indexes manager 663. In an example, the inverted indexes manager 663 allows the fact verification system to separately perform on-chain and off-chain processing for performing more efficient or quicker processing while retaining data immutability of blockchain technology. Further, such off-chain processing capabilities may allow the system conserve or limit usage of crypto assets in performing the fact verification transactions. More specifically, calculations and processing of documents may be performed off-chain, while storage of document IDs and/or metadata IDs may be retained on-chain.

In operation 631, the reliable documents storage contract 661 may send the doc ID and the metadata ID to the logs 664.

In operation 632, the document ID and the metadata ID are then sent to the inverted indexes manager 605 for off-chain storage. The inverted indexes manager 605 may add information received in the metadata to inverted indexes stored in the distributed database for immutable storage of the received information in operation 633. In operation 634, the inverted indexes manager 605 may retrieve documents and metadata corresponding to identified document ID and the metadata ID.

Figure 6B:
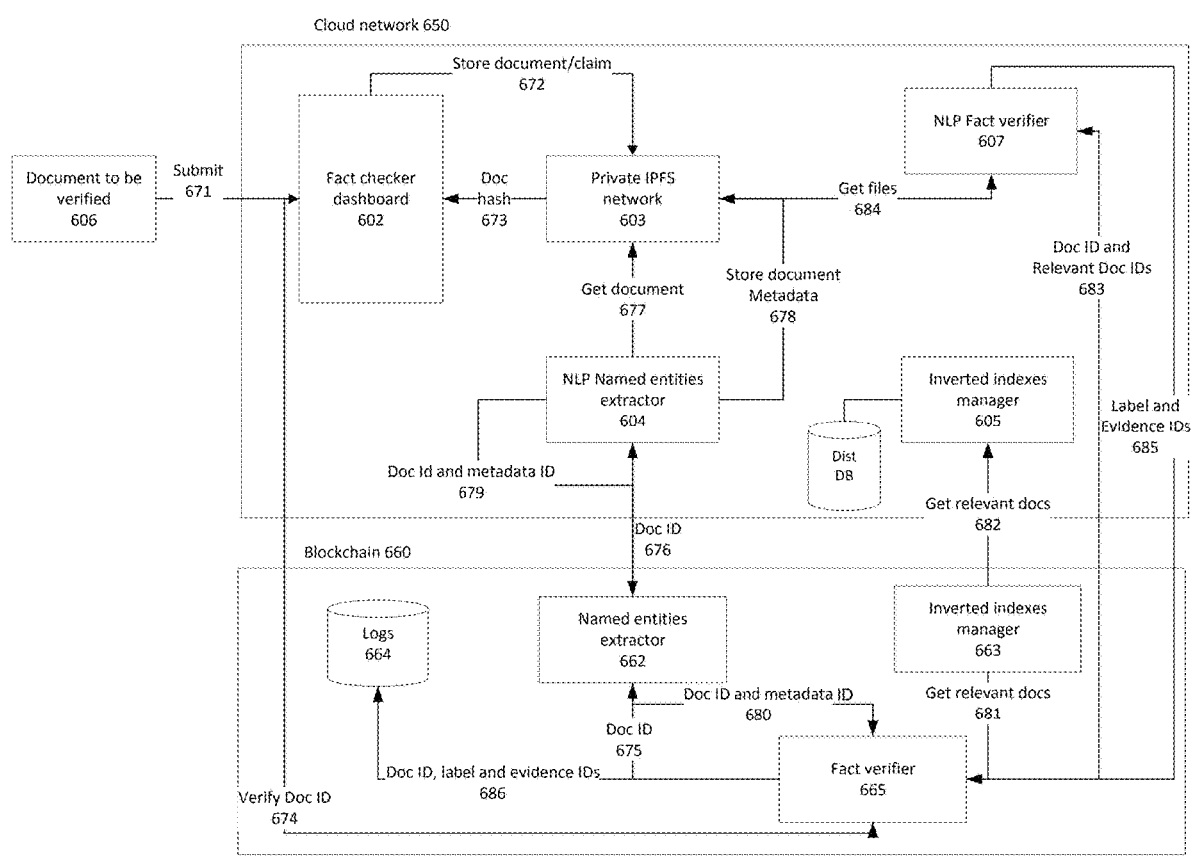
FIG. 6B illustrates a system architecture and a system flow for checking a document using a NLP algorithm and blockchain-based fact verification system in accordance with an exemplary embodiment.

FIG. 6B illustrates a system architecture and a system flow for checking a document using an NLP algorithms and blockchain based fact verification system in accordance with an exemplary embodiment.

FIG. 6B illustrates interactions between one or more computing devices residing in a cloud network 650 with one or more computing devices forming a blockchain 660. The cloud network 650 includes a fact checker dashboard 602, a private IPFS network 603, an NLP named entities extractor 604, an inverted indexes manager 605 and NLP fact verifier 607. On the other hand, the blockchain 660 includes a named entities extractor 662, an inverted indexes manager 663, logs 664 and fact verifier 665.

In operation 671, a document to be verified 606 is submitted to the fact checker dashboard 602. In operation 672, the new document to be added 601 is stored in the private IPFS network 603. The private IPFS network 603 then processes the document to be verified 606 to generate a document hash for identifying the document stored in the private IPFS network 603, and transmits the document hash to the fact checker dashboard 602 in operation 673. In operation 674, the fact checker dashboard 602 transmits a document ID from the document hash to the fact verifier 665 for verification of the document to be verified 606. The fact verifier 665 then stores the document ID and relays the document ID information to the named entities extractor 662 in operation 675. The named entities extractor 662 stores the document ID and relays the document ID information to the NLP named entities extractor 604 in operation 676.

In operation 677, the NLP named entities extractor 604 retrieves, from the private IPFS network 603, a document corresponding to the document ID and processes the document to extract out named entities (e.g., date, location, name of persons, companies and the like) as well as entity type, number of occurrences within the document, location within the document and the like as metadata. In operation 678, the metadata of the document to be verified 606 extracted out by the NLP named entities extractor 604 is then stored in the private IPFS network 603 in relation to the document ID. In operation 679, the document ID for the document to be verified 606 along with metadata ID for the extracted metadata are transmitted to the named entities extractor 662. In an example, the named entities extractor 662 allows the fact verification system to separately perform on-chain and off-chain processing for performing more efficient or quicker processing while retaining data immutability of blockchain technology. More specifically, calculations and processing of documents may be performed off-chain, while storage of document IDs and/or metadata IDs may be retained on-chain.

In operation 680, the named entities extractor 662 stores the received document ID and the metadata ID, and relays the document ID and the received metadata ID to the fact verifier 665.

In operation 681, the fact verifier 665 submits a request to the inverted indexes manager 663 to acquire or get relevant documents corresponding to the metadata, such as named entities extracted from the document to be verified. The request may specify the document ID and the metadata ID. In an example, the fact verifier 665 allows the fact verification system to separately perform on-chain and off-chain processing for performing more efficient or quicker processing while retaining data immutability of blockchain technology. More specifically, calculations and processing of documents may be performed off-chain, while storage of document IDs and/or metadata IDs may be retained on-chain. In an example, the inverted indexes manager 663 allows the fact verification system to separately perform on-chain and off-chain processing for performing more efficient or quicker processing while retaining data immutability of blockchain technology. More specifically, calculations and processing of documents may be performed off-chain, while storage of document IDs and/or metadata IDs may be retained on-chain.

In operation 682, the inverted indexes manager 605 receives the request, and retrieves document IDs of relevant documents from its distributed database, which securely and immutably stores the document IDs of the relevant documents. The retrieved document IDs corresponding to the relevant documents are then provided to the inverted indexes manager 663.

In operation 683, the fact verifier 665 transmits the document ID of the document to be verified 606 and document IDs of the relevant documents to the NLP fact verifier 607.

In operation 684, the NLP fact verifier 607 retrieves the documents corresponding to the document ID of the document to be verified 606 and the document IDs of the relevant documents. Once a list of relevant documents is retrieved, the documents' metadata indicating a starting point and an ending of various entities may be used to determine which part of the text to use for sentence selection. For example, a predetermined number of words or sentence before the start or after the end of the entities may be identified for selection of evidentiary text to be utilized. Based on the retrieved documents, the NLP fact verifier 607 may be able to render a verdict as to whether the document or claim to be verified 607 is sufficiently supported by the verified evidence stored in the 660 blockchain.

The NLP fact verifier 607 may then perform verification of the submitted claim/document based on the list of evidence hashes provided by the 660 blockchain as exemplified in FIG. 7 discussed above. Based on the relevant evidence, a score or a label may be provided to indicate a level of authenticity. For example, a numerical score, an alphabetical score, or a label (e.g., supported, refuted, not enough information) may be provided. However, aspects of the present disclosure are not limited thereto, such that additional algorithms or models may be executed by the NLP fact verifier 607 to check for authenticity based on semantics, use of grammar, spelling errors and the like. For example, use of incorrect or foreign grammar and/or various spelling errors may raise question of authenticity and may be scored accordingly. In operation 685, the resulting label along with evidence IDs are then transmitted from the NLP fact verifier 607 to the fact verifier 665 in the block chain 660. In operation 686, document ID, resulting label and corresponding evidence IDs are then stored in the logs 664 of the blockchain 660.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tape or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatuses and systems that use the structures or methods described herein. Many other embodiments may be apparent to those of skill in the art upon reviewing the disclosure. Other embodiments may be used and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, would be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing fact verification, the method comprising:
    performing, using a processor and a memory:
        receiving a document for verification on a computer network;
        transmitting, from the computer network to a blockchain, a document identifier (ID) corresponding to the received document, the blockchain being facilitated by a plurality of computers;
        receiving the document ID from the blockchain and retrieving the document for verification corresponding to the document ID;
        identifying and extracting, on the computer network, one or more named entities from the document for verification and associated information as metadata;
        sending, to the blockchain, the document ID along with a metadata ID corresponding to the extracted metadata;
        identifying, off the blockchain, one or more identifiers of one or more relevant documents corresponding to each of the one or more named entities, the one or more relevant documents being authenticated documents including the one or more named entities;
        identifying a predetermined number of relevant documents among the identified one or more relevant documents based on a number of the one or more named entities present and a number of occurrences for each of the named entities;
        transmitting the document ID along with the identifiers of the predetermined number of relevant documents to the computer network;
        performing verification of the document by executing one or more machine learning algorithms to determine whether the document to be verified is supported by the predetermined number of relevant documents; and
        providing and storing a verdict for the document to be verified with supporting evidence from the predetermined number of relevant documents.

2. The method according to claim 1, wherein the metadata specifies at least a type of the at least one named entity, a location of the at least one named entity within the document, and a number of occurrences.

3. The method according to claim 1, further comprising:
    submitting an authenticated document to the computer network;
    identifying and extracting one or more named entities from the authenticated document using a natural language processing (NLP) algorithm;
    for each of the one or more named entities extracted from the authenticated document, identifying a type of a named entity, a number of occurrences of the named entity, and a location of the named entity within the authenticated document as metadata of the named entity;
    storing the authenticated document and the metadata; and
    storing an identifier of the authenticated document and an identifier of the metadata in the blockchain.

4. The method according to claim 1, wherein the one or more machine learning algorithms include an NLP algorithm.

5. The method according to claim 4, wherein the performing of the verification is executed by at least one of analyzing text style, analyzing context, recognizing bias, and analyzing grammar.

6. The method according to claim 1, wherein a claim included in the document is verified in the performing of the verification.

7. The method according to claim 1, wherein the supporting evidence includes a sentence in one of the one or more relevant documents including the one or more named entities.

8. The method according to claim 7, wherein the supporting evidence further includes a preceding sentence and/or a subsequent sentence.

9. The method according to claim 1, wherein the supporting evidence includes material from a first document among the one or more relevant documents including at least a first named entity among the one or more named entities, and material from a second document among the one or more relevant documents including at least a second named entity among the one or more named entities.

10. The method according to claim 1, wherein documents and metadata are stored in the computer network but not in the blockchain, while identifiers corresponding to the documents and the metadata are stored in the blockchain.

11. The method according to claim 1, wherein the document for verification is stored on a private network.

12. The method according to claim 1, wherein the blockchain is configured to perform off-chain processing.

13. The method according to claim 1, wherein a smart contract resides in the blockchain.

14. The method according to claim 1, wherein the document is a text document, a claim, an image, a video clip, a multimedia object or a digital object.

15. The method according to claim 1, wherein the verdict is a numerical score.

16. The method according to claim 1, wherein the verdict is a label indicating whether the document to be verified is supported, refuted or not enough information.

17. The method according to claim 1, wherein the blockchain is a proof-of-stake blockchain.

18. The method according to claim 1, wherein the blockchain is a proof-of-work blockchain.

19. A system for performing fact verification, the system comprising:
- at least one processor;
- at least one memory; and
- at least one communication circuit,
- wherein the at least one processor performs:
- receiving a document for verification on a computer network;
- transmitting, from the computer network to a blockchain, a document identifier (ID) corresponding to the received document, the blockchain being facilitated by a plurality of computers;
- receiving the document ID from the blockchain and retrieving the document for verification corresponding to the document ID;
- identifying and extracting, on the computer network, one or more named entities from the document for verification and associated information as metadata;
- sending, to the blockchain, the document ID along with a metadata ID corresponding to the extracted metadata;
- identifying, off the blockchain, one or more identifiers of one or more relevant documents corresponding to each of the one or more named entities, the one or more relevant documents being authenticated documents including the one or more named entities;
- identifying a predetermined number of relevant documents among the identified one or more relevant documents based on a number of the one or more named entities present and a number of occurrences for each of the named entities;
- transmitting the document ID along with the identifiers of the predetermined number of relevant documents to the computer network;
- performing verification of the document by executing one or more machine learning algorithms to determine whether the document to be verified is supported by the predetermined number of relevant documents; and
- providing and storing a verdict for the document to be verified with supporting evidence from the predetermined number of relevant documents.

20. A non-transitory computer readable storage medium that stores a computer program for performing fact verification, the computer program, when executed by a processor, causing a system to perform a process comprising:
- receiving a document for verification on a computer network;
- transmitting, from the computer network to a blockchain, a document identifier (ID) corresponding to the received document, the blockchain being facilitated by a plurality of computers;
- receiving the document ID from the blockchain and retrieving the document for verification corresponding to the document ID;
- identifying and extracting, on the computer network, one or more named entities from the document for verification and associated information as metadata;
- sending, to the blockchain, the document ID along with a metadata ID corresponding to the extracted metadata;
- identifying, off the blockchain, one or more identifiers of one or more relevant documents corresponding to each of the one or more named entities, the one or more relevant documents being authenticated documents including the one or more named entities;
- identifying a predetermined number of relevant documents among the identified one or more relevant documents based on a number of the one or more named entities present and a number of occurrences for each of the named entities;
- transmitting the document ID along with the identifiers of the predetermined number of relevant documents to the computer network;
- performing verification of the document by executing one or more machine learning algorithms to determine whether the document to be verified is supported by the predetermined number of relevant documents; and
- providing and storing, on the blockchain, a verdict for the document to be verified with supporting evidence from the predetermined number of relevant documents.

* * * * *